United States Patent [19]
Nedungadi et al.

[11] Patent Number: 6,110,066
[45] Date of Patent: Aug. 29, 2000

[54] PARALLEL HYBRID DRIVETRAIN

[75] Inventors: Ashok Nedungadi; Mark Walls, both of San Antonio; Dimitrios Dardalis, Austin, all of Tex.

[73] Assignee: Southwest Research Institute, San Antonio, Tex.

[21] Appl. No.: 09/019,467

[22] Filed: Feb. 5, 1998

[51] Int. Cl.$^7$ ................................................. B60K 41/28
[52] U.S. Cl. .............................................. 475/5; 130/65.3
[58] Field of Search ........................... 475/2, 5; 477/2, 477/3; 180/65.3, 65.4

[56] References Cited

U.S. PATENT DOCUMENTS

| | | |
|---|---|---|
| 3,566,717 | 3/1971 | Berman et al. . |
| 4,305,254 | 12/1981 | Kawakatsu et al. . |
| 4,407,132 | 10/1983 | Kawakatsu et al. . |
| 4,470,476 | 9/1984 | Hunt . |
| 5,433,282 | 7/1995 | Moroto et al. . |
| 5,643,119 | 7/1997 | Yamaguchi et al. . |

*Primary Examiner*—Dirk Wright
*Attorney, Agent, or Firm*—Paula D. Morris & Associates P.C.

[57] ABSTRACT

A hybrid vehicle includes an internal combustion engine, an electric motor/generator and a battery. The drivetrain includes a planetary gear in which the engine is coupled to the sun gear, the motor/generator to the ring gear and the vehicle wheels to the carrier of the planetary. A controller switches the vehicle between electric, assist, charge and regenerative modes of operation and substantially decouples the engine speed from the vehicle speed, enabling the engine to operate at peak efficiency. Additional overdrives are included to enable the engine to operate at optimum speed in the various modes of operation.

28 Claims, 10 Drawing Sheets

SPEED

PARALLEL HYBRID DRIVETRAIN

FIELD OF THE INVENTION

The present invention relates to an apparatus and a method for controlling an engine/electric hybrid vehicle. More specifically, the present invention relates to an apparatus and method for controlling an engine/electric hybrid vehicle to obtain improved fuel efficiency.

BACKGROUND OF THE INVENTION

An electric vehicle has been considered as one of the most effective means of transportation because of the lack of pollution compared with vehicles employing internal combustion engines. However, electric vehicles suffer from various disadvantages, such as a long charge time for the battery and a limited range. Electric hybrid vehicles have been used in which an internal combustion engine is used along with a battery powered electric motor to combine the best features of the two types of propulsion. Such an electric hybrid consumes fuel while the engine is running and consumes electric power when the electric motor is running.

There are two types of hybrid vehicles: series hybrid and parallel hybrid. In a series hybrid vehicle, driving power is delivered by an electric motor that converts electrical energy stored in batteries into mechanical energy at the wheels. The battery is charged by a generator coupled to a conventional internal combustion engine. The combustion engine in a series hybrid vehicle is used to charge the battery when its state of charge falls below a predetermined threshold.

In a parallel hybrid vehicle, on the other hand, tractive propulsion is obtained simultaneously from the internal combustion engine and the electric motor. By an appropriate control strategy, the electric motor may be used in a generating mode to charge the battery when it is nearly depleted. A parallel hybrid arrangement provides a more efficient and direct transfer of mechanical energy from the engine and electric motor to the driving wheels than a series hybrid arrangement in which the mechanical energy is first converted to electrical energy by the generator and then converted to mechanical energy at the wheels.

There are four broad categories of parallel hybrid configurations: (a) a combination of traction forces, in which traction torques from the engine and electric motor are applied separately to different pairs of wheels and combined through their mutual interaction with the road; (b) combination of torques, where the driving torques from the engine and electric motor are mechanically combined (by a gear arrangement or belt) with a two-shaft arrangement before being applied to the transmission; (c) combination of torques wherein the engine and electric motor share a common propulsion shaft; and, (d) combination of speeds, in which the engine and electric motor operate at different speeds and input their respective driving torques into a complex gear system, which mechanically combines the torques before transmitting it to the differential. The present invention is a combination of speeds type.

SUMMARY OF THE INVENTION

The present invention comprises a hybrid vehicle including an internal combustion engine and a motor energized by a battery, adapted so that the internal combustion engine operates in a region of better fuel efficiency. By using a novel drivetrain, the engine speed is essentially decoupled from the vehicle speed. The engine speed can be selected (with some limitations) to optimize efficiency and performance. The overall drivetrain (gear box) operation will approach that of a Continuous Variable Transmission (CVT).

A planetary gear arrangement is used to combine the power from the electric motor and the engine. There are four modes of operation for the vehicle, namely: (a) electric; (b) charge; (c) assist; and, (d) regenerative. In the electric mode, only the motor is providing propulsion power to the vehicle. In the charge mode, part of the engine power drives the vehicle and the rest is absorbed by the motor (operating as a generator) to charge the batteries. In the assist mode, both the engine and the motor are providing power to propel the vehicle. In the regenerative mode, power from the decelerating wheels is diverted to the motor so that it can be used to charge the batteries.

DETAILED DESCRIPTION OF THE INVENTION

Figure 1:
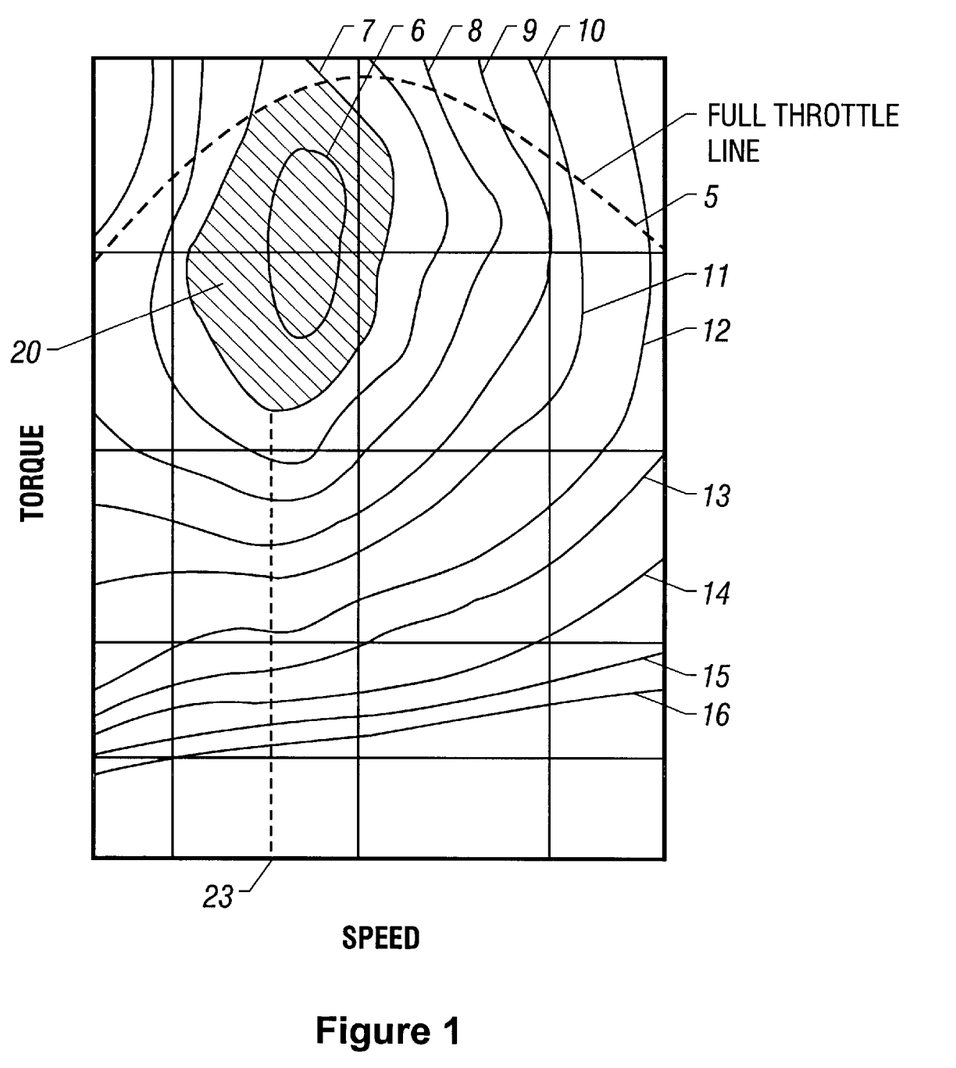
FIG. 1 is a graph showing the fuel consumption characteristic of a diesel engine.

The present invention is best understood by reference to FIGS. 1–7. FIG. 1 is a graph showing the fuel consumption characteristic of an internal combustion engine, in this case (for illustrative purposes only) a diesel engine. The abscissa is the rotary speed of the engine and the ordinate is the torque developed by the engine. Curves 6–16 are fuel consumption contours, with 6 being the lowest value and 16 being the highest. Also indicated in FIG.1 is a curve 5 corresponding to a full throttle opening of the engine. The objective of the invention is to attempt to maintain the engine, when it is operating, within the region 20 defined by the consumption contour 7 and the full throttle curve 5 independent of the speed of the vehicle. A motor/generator is used to supplement the internal combustion engine to ensure that the internal combustion engine is operating at a desired optimum speed. When the vehicle speed and power demands are such that it is difficult to maintain the engine within this desired region, then the motor/generator is used by itself to meet the vehicle requirements.

Figure 2A:
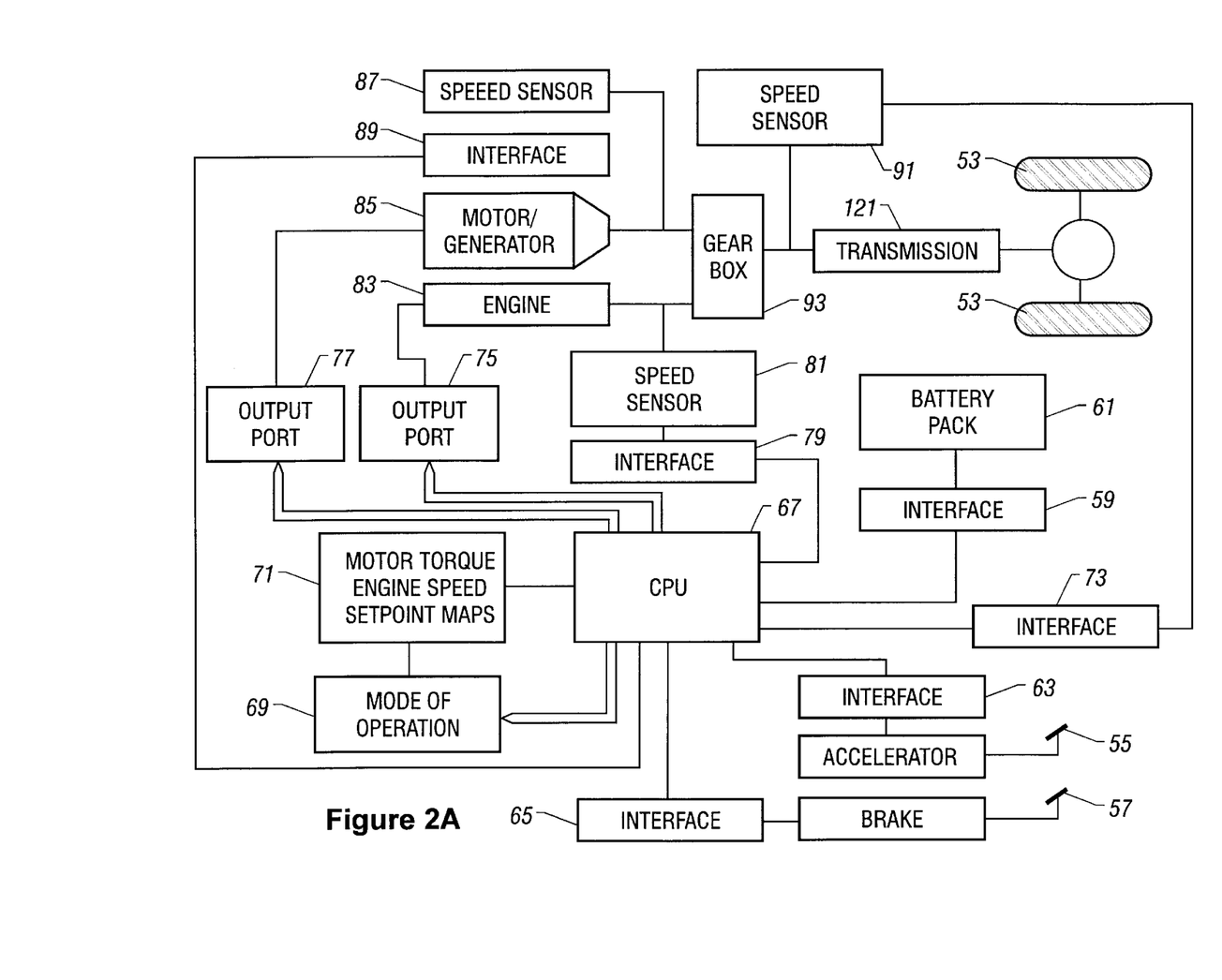
FIG. 2A is a schematic diagram of a vehicle having a planetary gear arrangement according to the present invention.

FIG. 2A is a schematic diagram of a vehicle having a planetary gear arrangement according to the present invention. The vehicle has a set of wheels 53. The driver of the vehicle (not shown) has access to an accelerator pedal 55 and a brake pedal 57 to control the speed of the vehicle.

Through interfaces 63 and 65 respectively, a signal corresponding to the position of the accelerator and brake pedals is communicated to the processor 67.

The gearbox 93 is coupled to an internal combustion engine 83 through a clutch (not shown) controlled by the main vehicle central processing unit (CPU), a motor/generator 85, and through a differential transmission 121, controlled by the CPU, to the wheels of the vehicle. Speed sensor 81 measures the rotary speed of the internal combustion engine 83 and communicates this speed through interface 79 to the processor 67. Speed sensor 87 measures the rotary speed of the motor/generator 85 and communicates this speed through interface 89 to the processor 67. Speed sensor 91 measures the speed of the output shaft of the gearbox 93 and communicates this speed through interface 73 to the processor 67.

The vehicle also has a battery pack 61 connected through a cable (not shown) to the motor/generator 85. The state of charge of the battery pack 61 is communicated by interface 59 to the processor 67. Based upon the information about the engine, motor/generator and vehicle speeds and upon the operator demands from the accelerator or brake, the processor decides the mode of operation 69 of the drivetrain and sends control signals through output ports 75 and 77 to the internal combustion engine and the motor/generator. In addition, as part of selection of the mode of operation, the processor also sends signals to the gearbox and changes the gear configuration. Details of this are discussed below in reference to FIGS. 7A and 7B. In making the decision about the mode of operation, the controller 67 has access to setpoint maps stored in a memory device 71. The process of obtaining the setpoint maps is discussed below with reference to FIGS. 5–6.

Figure 2B:
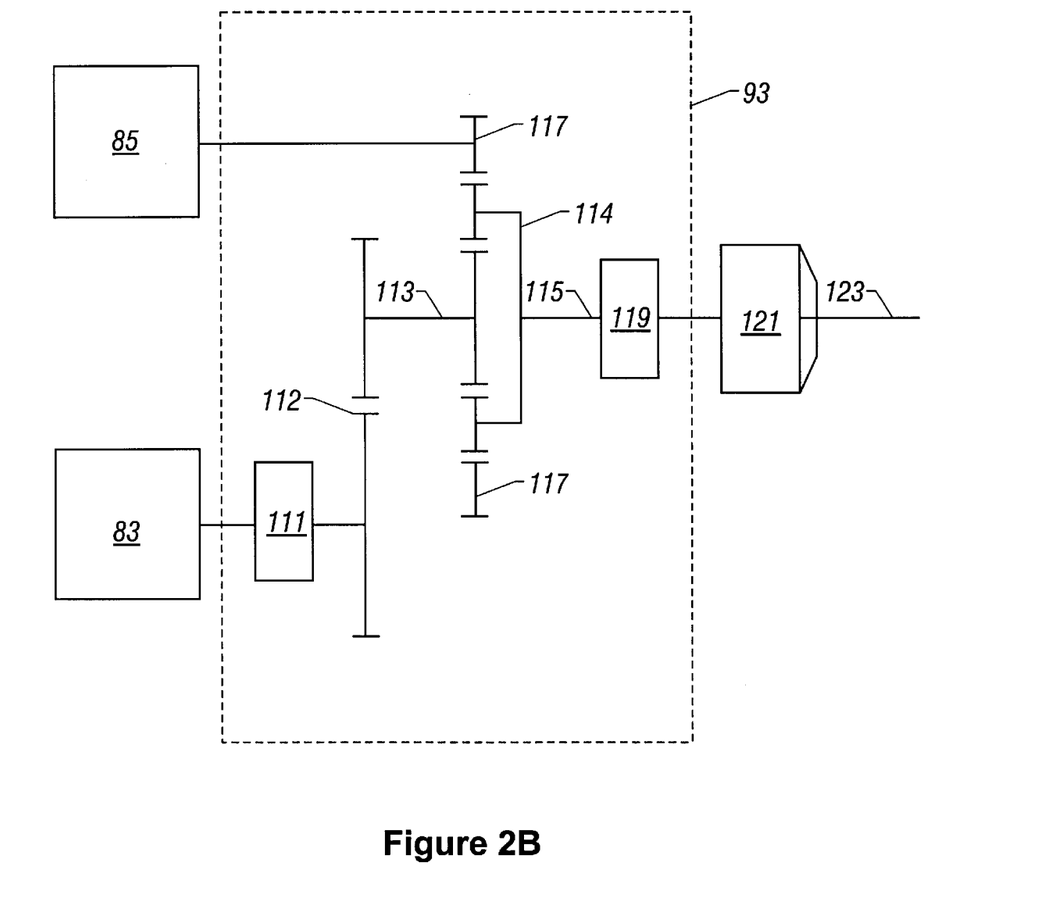
FIG. 2B is a schematic diagram showing the coupling of the planetary gear arrangement to the power sources and the wheels.

FIG. 2B is a schematic diagram showing the coupling of the planetary gear arrangement to the power sources and the wheels. Shown are the internal combustion engine 83 and an electric motor/generator 85. In the preferred embodiment of the invention, the motor/generator 85 is an induction motor. The engine 83 and the motor/generator 85 are coupled to a gear arrangement shown generally at 93. By using a planetary gear arrangement, the engine speed is essentially decoupled from the vehicle speed. The engine speed can be arbitrarily selected (with some limitations) to optimize efficiency and performance. The overall drivetrain operation will approach that of a Continuous Variable Transmission. The engine is connected to the shaft 113 of the sun gear through an overdrive 111 and a chain or belt drive 112. The motor/generator 85 is directly coupled to the ring gear 117 of the planetary gear arrangement. The general rule is to attach the higher torque source to the ring and the lower torque source to the sun. This ensures acceptable power at the carrier 114 to power the vehicle. The shaft of the carrier 115 is connected through a second overdrive 119, a two-speed transaxle differential 121 and the output shaft 123 to the wheels of the vehicle (not shown). The second overdrive 119 preferably has an overdrive ratio (input to output speed) of approximately 0.33. The second overdrive is necessary to maintain reasonable vehicle speed during charging of the batteries.

The ratio of engine speed to sun speed maintained by the chain or belt drive 112 is preferably 0.7. The first overdrive unit 111 incorporates a two-speed gearbox with, preferably, a ratio of 1:1 input to output when not engaged and 0.797:1 when engaged. The first overdrive is engaged when the load on the engine is too low. Finally, there is a band brake (not shown in FIG. 2B but shown in FIG. 2C and discussed below) on the sun, ring and carrier of the planetary.

Figure 2C:
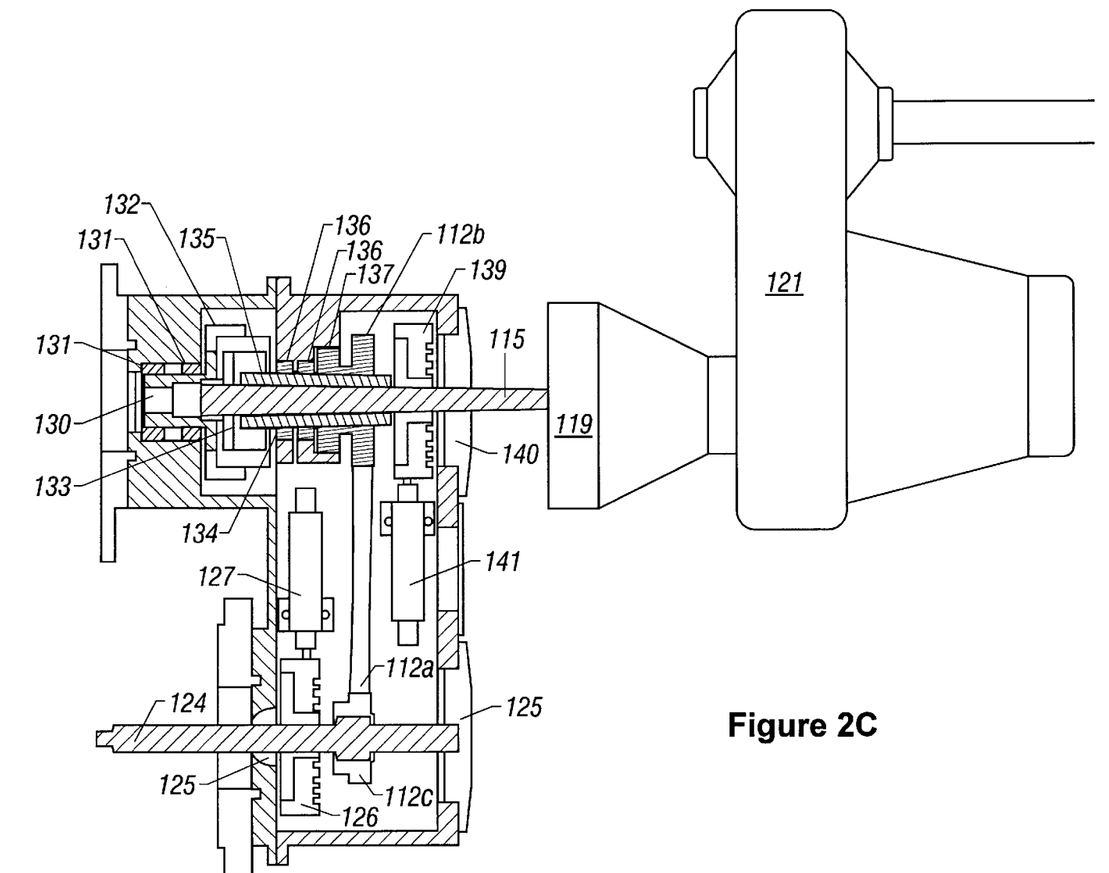
FIG. 2C illustrates a cross section of the gear box according to the present invention.

FIG. 2C illustrates in more detail the configuration of the planetary gear box. The engine shaft is coupled through overdrive 111 (not shown) to the engine input shaft 124 supported on bearings 125. Sun brake 126, operated by the sun brake actuator 127 under control of the processor 67 (see FIG. 2A) is capable of slowing down and stopping the engine input shaft 124. The sun gear 135 is coupled to the engine input shaft 124 by a drive chain 112a and sprockets 112b and 112c on the sun gear and the input shaft respectively. The sun gear is supported by bearings 136 and the sprag clutch 137 ensures uni-directional rotation of the sun gear with bi-directional transfer of torque.

The carrier gear 133 is supported by carrier bearing 140 and coupled to the carrier output shaft 115. The carrier brake 139, operated by the carrier brake actuator 141 under control of the processor 67 (see FIG. 2A) is capable of stopping the carrier motion when the vehicle is stopped, for example at a red light. This allows the batteries to be charged.

The ring gear 130 is supported by bearings 131 and is coupled to the motor/generator 85 (see FIG. 2A). The ring gear too is provided with a ring brake 132. The operation of the vehicle is discussed below with reference to FIGS. 2A–7B.

There are four modes of operation for the vehicle, namely: (a) electric; (b) charge; (c) assist; and, (d) regenerative. In the electric mode, only the motor is providing propulsion power to the vehicle. In the charge mode, part of the engine power drives the vehicle and the rest is absorbed by the motor (operating as a generator) to charge the batteries. In the assist mode, both the engine and the motor are providing power to propel the vehicle. In the regenerative mode, power from the decelerating wheels is diverted to the motor so that it can be used to charge the batteries. The transition from one mode to the other is smooth and transparent to the vehicle driver. The controller selects the most appropriate mode depending upon the position of the accelerator pedal, the vehicle speed and the state of charge of the battery. The strategy to select the appropriate mode is described below.

In the assist mode, the sun 113 (driven by the engine 83) and the ring 117 (driven by the motor 85, see FIG. 2B) rotate in the same direction. Their power is combined to the carrier, the carrier being forced to rotate in the same direction as the sun and the ring. In the charge mode, the motor turns in the opposite direction to that of the engine while the torque in the carrier is in the same direction as the engine. However, when the ring rotates in a direction opposite to the sun (with the motor operating as a generator to charge the batteries), the carrier speed is too low for normal driving. To compensate for this, the second overdrive 115 is engaged with the overdrive ratio of 0.33, thus maintaining the vehicle speed at the desired level. In the electric mode, the sun is locked. The motor power flows directly from the ring 117 to the carrier. In the regenerative mode, the sun gear is locked and power flows directly from the wheels to the motor/generator.

Figure 3:
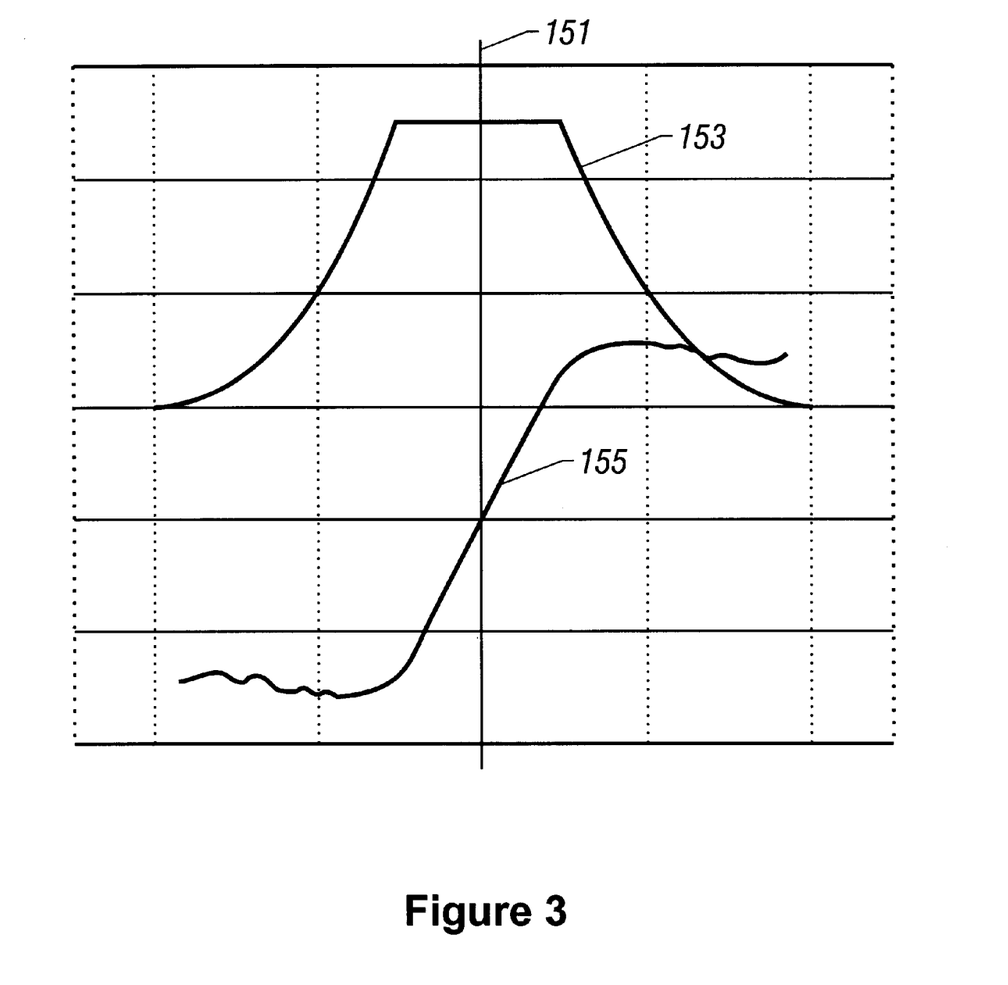
FIG. 3 shows the operating characteristics of an a.c. induction motor.

FIG. 3 shows the operating characteristics of the motor/generator. The abscissa is the motor/generator speed and the ordinate is the output of the motor/generator. Two curves are show: 153 is the torque of the motor/generator and 155 is the power output of the motor/generator. The line 151 is the demarcation between operation as a motor (to the right) and operation as a generator (to the left). For illustrative purposes only, the range of torques (ft-lb) and power (HP) is from −100 to +200 and the speed range is from −10,000 to +10,000 rpm.

Figure 4:
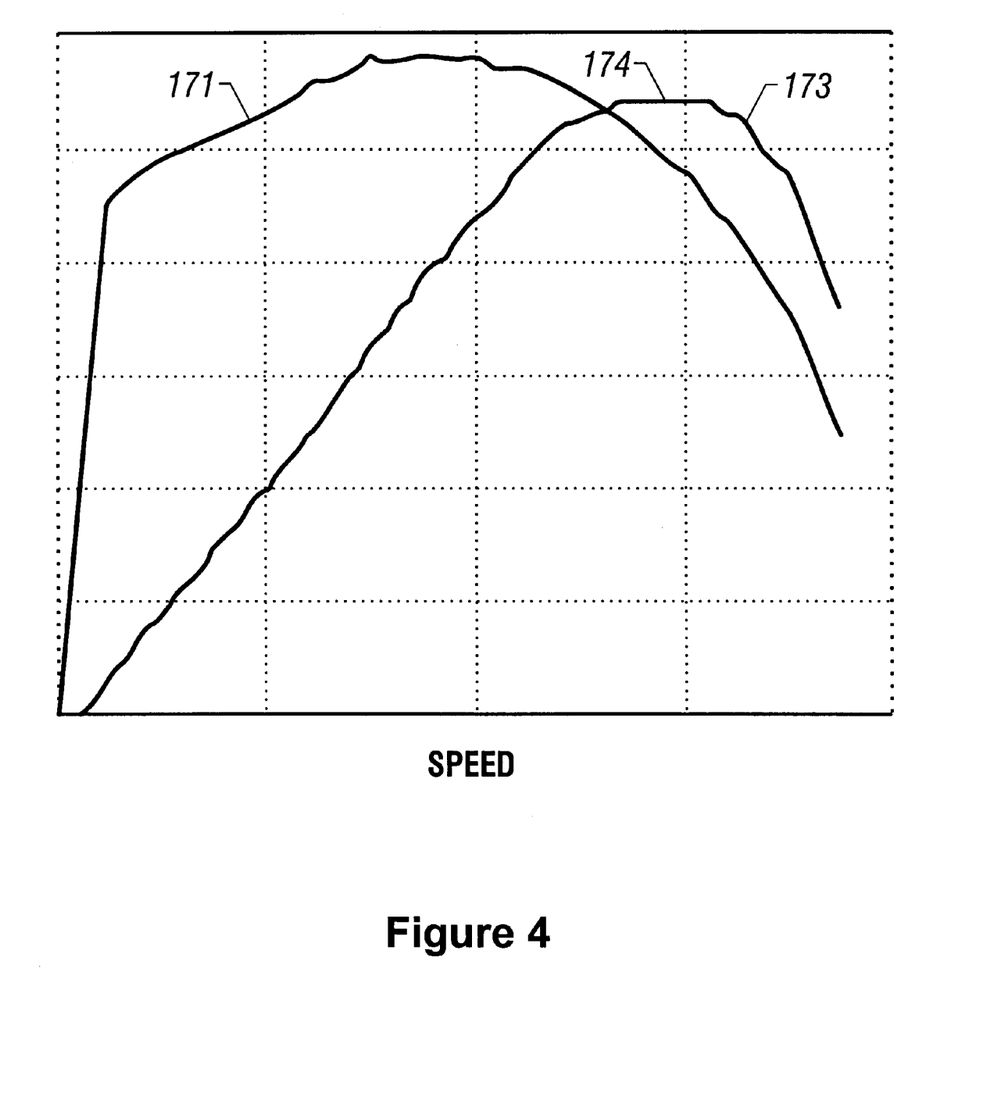
FIG. 4 shows the operating characteristics of an internal combustion engine.

FIG. 4 shows the operating characteristics of an engine over (for illustrative purposes) a speed range of 0 to 8000 rpm. 171 is the torque and 173 is the power output of the engine. Again, for illustrative purposes only, the scale is from 0 to 60 HP and 0 to 60 ft-lb.

Comparison of FIG. 3 with FIG. 4 shows that the motor has a large torque available at low speeds whereas the engine does not. It is very desirable to use this increased torque of the motor at low speeds to avoid the use of a multi gear transmission.

Neglecting energy losses in the planetary gear, the equations governing the speeds and torques of the various primer movers is given by:

$$\tau_C \omega_C = \tau_R \omega_R + \tau_S \omega_S \quad (1)$$

$$\omega_C = \frac{\omega_S R_S + \omega_R R_R}{2(R_S + R_P)} \quad (2)$$

and $$\frac{\tau_S}{\tau_R} = \frac{R_S}{R_R} \quad (3)$$

where:

$\tau_C$: Torque out of the carrier of the planetary;
$\tau_R$: Torque out of the ring of the planetary
$\tau_S$: Torque out of the sun of the planetary
$\omega_C$: Carrier speed of the planetary
$\omega_R$: Ring speed of the planetary
$\omega_S$: Sun speed of planetary
$R_R$: Radius of ring gear
$R_S$: Radius of sun gear
$R_P$: Radius of planetary gear=$(R_R-R_S)/2$ Equation (1) describes the conservation of power in a steady state, assuming no losses in the planetary gear. Equation (2) is the kinematic constraint of a planetary gear and equation (3) describes the balance of torques between the sun and the ring in the steady state.

The described system of a motor/generator coupled to an engine is inherently unstable. The speeds of the two power plants (the motor/generator and the engine) are decoupled, but the torques are not. An increase on the torque of either power plant will impose a load on the other. Thus, the torques from both power sources must be balanced to keep the system at the desired, stable operating conditions. The engine throttle is operated by an engine speed controller to ensure that the engine's speed is maintained at the desired optimum. In the assist mode, this is the speed at which the engine generates maximum power, 174 in FIG. 4. In the charge mode, this optimum speed corresponds to maximum fuel efficiency of the engine, 23 in FIG. 1. The motor is controlled by controlling its torque to ensure that the load required by the vehicle is met. The engine speed and motor torque setpoints for the two controllers are defined in a lookup table.

Figure 5:
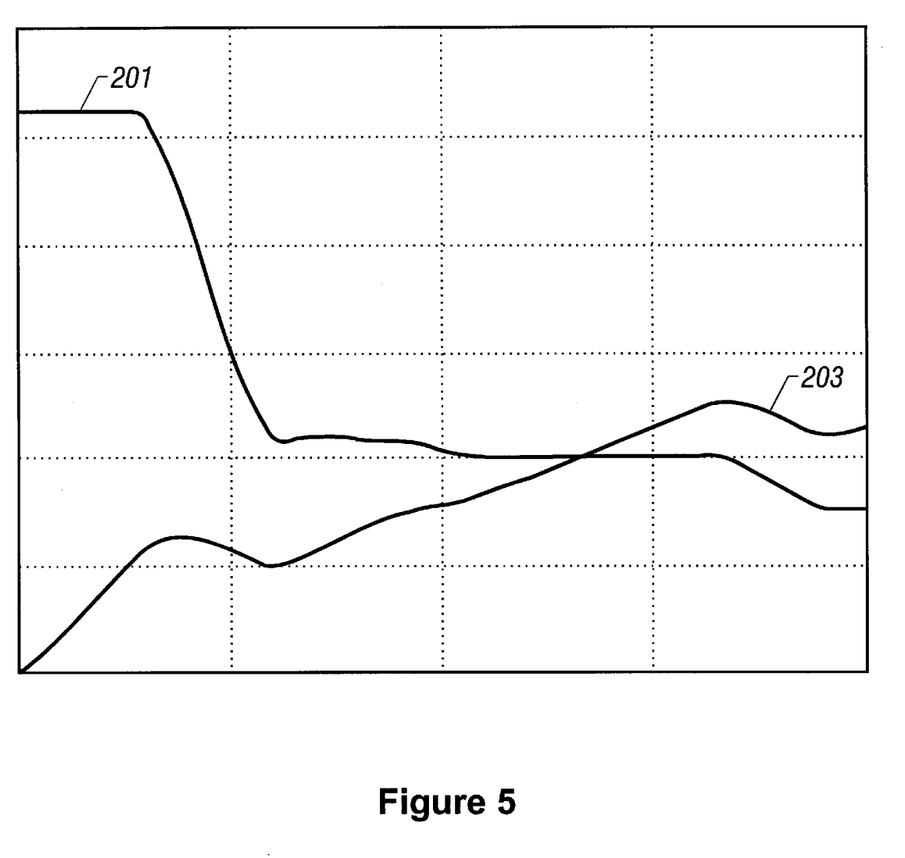
FIG. 5 shows the maximum carrier output torque and power as a function of carrier speed.

A different lookup table is defined for each of the operating modes of the engine. FIG. 5 shows the maximum carrier output torque and HP as a function of carrier speed. The assist mode is the one that can deliver the highest torque to the wheels. This is the mode that is active at increased torque demand from the driver, as defined by the accelerator pedal that is depressed by the driver of the vehicle. The abscissa is the carrier speed and the ordinate is the maximum torque or power: curve 201 is the maximum torque of the carrier and 203 is the maximum power of the carrier in the assist mode.

Figure 6:
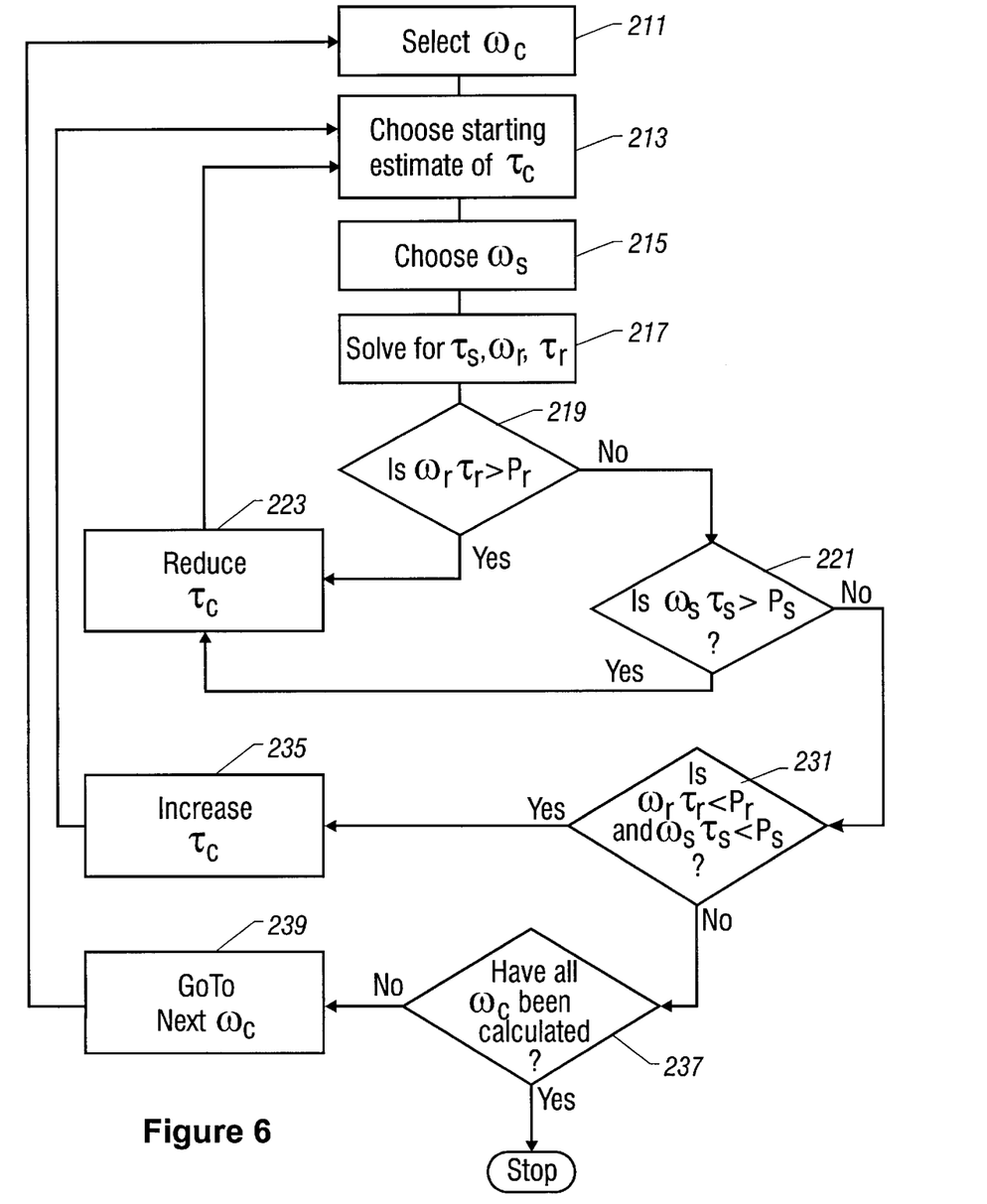
FIG. 6 illustrates the manner in which the maximum torque-speed curve is determined.

The curves in FIG. 5 are computed by a method illustrated by the flow chart in FIG. 6. The first step is to select a carrier speed $\omega_C$ for which the maximum torque is to be determined. This is done at 211. Next, an initial estimate is made of the maximum carrier torque $\tau_C$, as indicated at 213. An engine speed $\omega_S$ is selected at 215. Because computations are being carried out for the assist mode, fuel economy is not the primary consideration: instead, maximum power output is. Accordingly, the selected engine speed is close to the speed that provides maximum engine power, as indicated by the speed 174 in FIG. 4.

Equations 1–3 are three equations in six unknowns. At 215 three of these unknowns have values assigned to them. Consequently, equations 1–3 can be solved for the remaining unknowns, $\tau_S$, $\tau_R$, and $\omega_R$. A check is made at 219 and 221 to see if the computed torque exceeds the capacity of the motor or the engine. If so, then the estimated maximum torque is too large. The maximum carrier torque is reduced at 223 and calculations are restarted to 213 with a lower value of the maximum torque $\tau_C$ in the assist mode. If, on the other hand, the computed power is less than the capacity of the motor and the engine, the estimated maximum carrier torque is too low. The maximum carrier torque is increased at 235 and calculations are restarted at 213.

Once an acceptable solution is found, a check is made to see if the maximum torque has been calculated for all carrier speeds for which a table is to be constructed at 237. If not, the next carrier speed is chosen at 239 and the calculations restarted at 211. Once the maximum torque has been calculated for all carrier speeds, the calculations in FIG. 6 are terminated.

Those versed in the art would recognize obvious changes in the calculations that would be necessary to adjust for any gear arrangements between the motor/generator and the ring, and between the engine and the sun.

In the electric mode and the regenerative mode, the maximum torque as a function of carrier speed is easily determined from FIG. 3 because the sun gear is locked in place. For the charge mode, the torque calculations are very similar to those shown with reference to the assist mode in FIG. 6 with one difference: the engine speed selected at 215 is chosen with maximum fuel economy as the consideration. This would correspond to a value such as 23 in FIG. 1. Also, the resulting ring torque has to be negative to ensure absorption of mechanical power by the motor/generator.

Figure 7A:
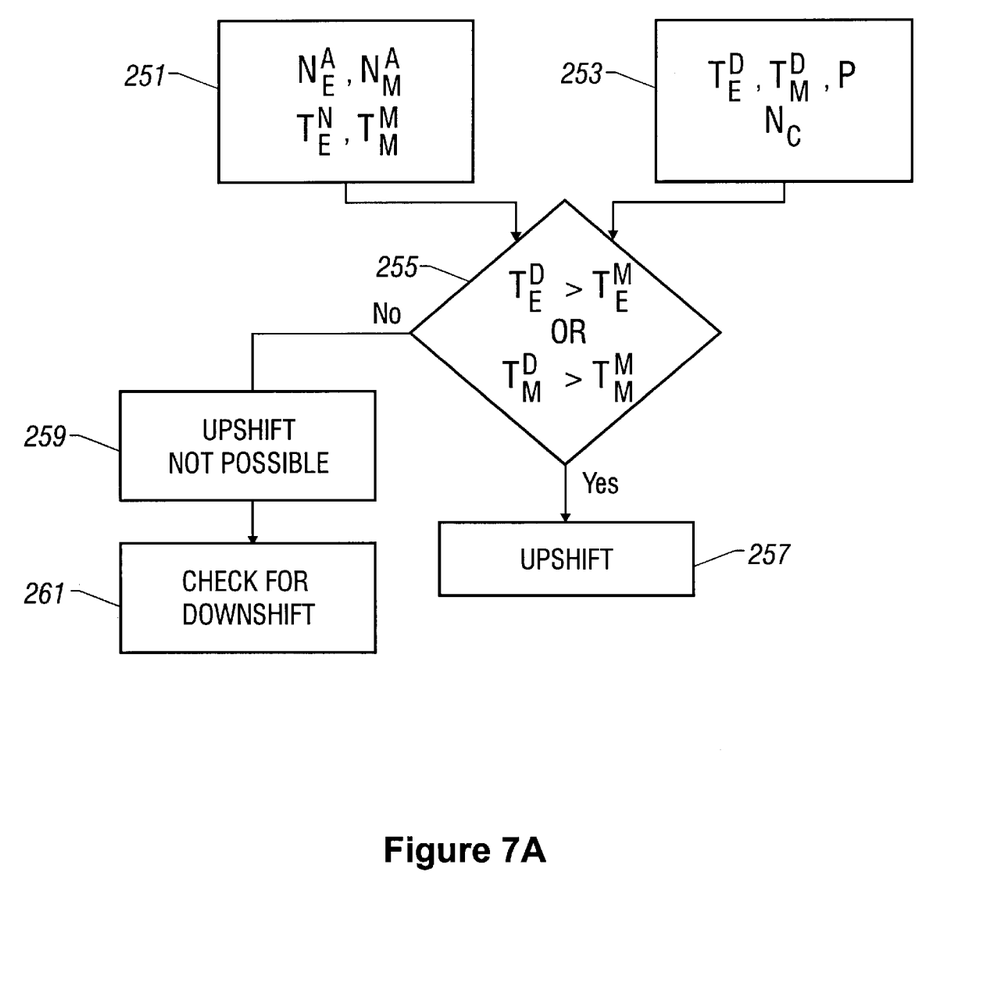
FIGS. 7A and 7B illustrate how a decision to shift the mode of operation is made by the processor.
Figure 7B:
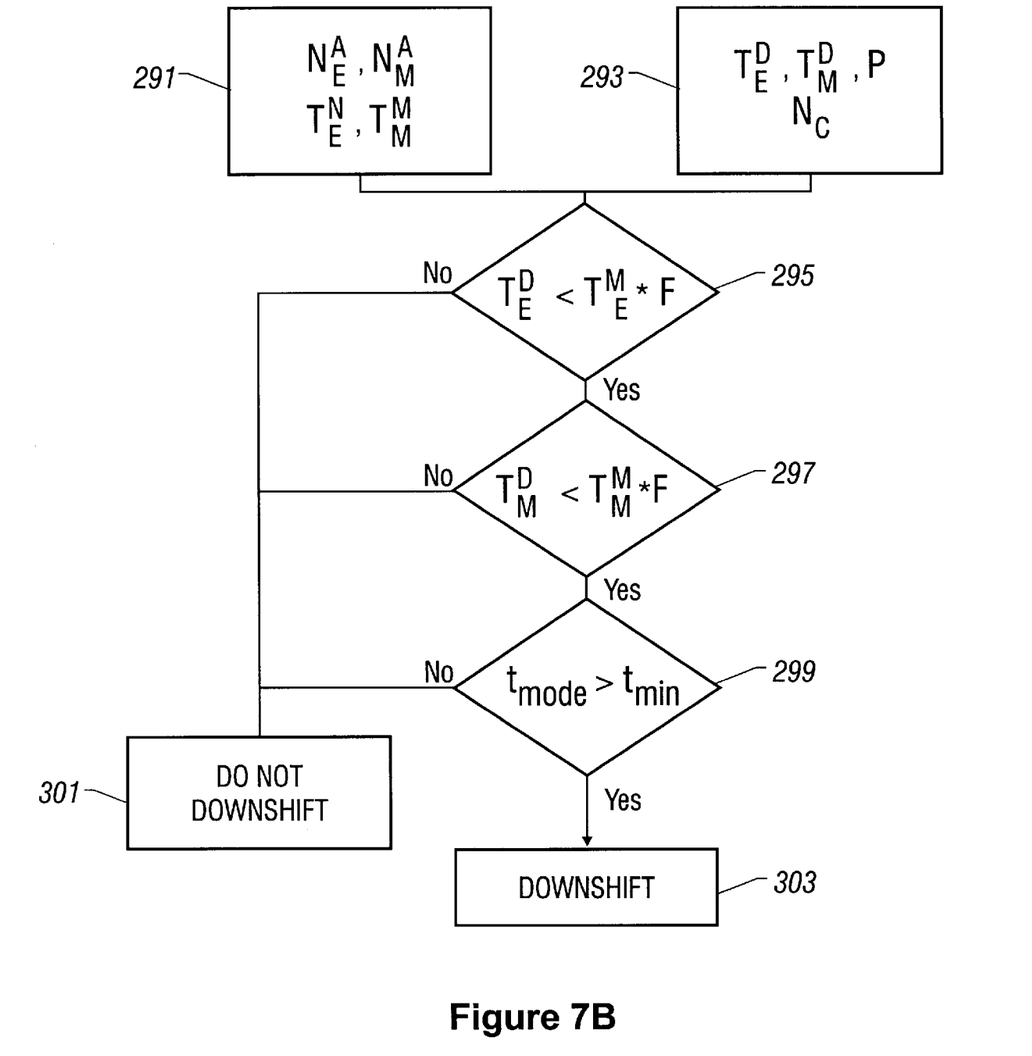

FIGS. 7A and 7B show how the controller decides to shift the vehicle from one operating mode to another. The modes of the vehicle are numbered as 1, 2 and 3 for electric, charge and assist, respectively. The available torque increases with the higher mode. Therefore, mode 2 (charge) can produce more torque than mode 1 (electric) and mode 3 (assist) produces more torque than mode 2 at a given output speed of overdrive 119 (see FIG. 2B). At any given time, the current operating condition of the vehicle is given by engine and motor speeds $N^A_E$ and $N^A_M$ where the subscript E and M refer to the engine and motor respectively and the superscript A refers to the actual state of the engine or the motor. Corresponding to the engine and motor speeds $N^A_E$ and $N^A_M$ are maximum engine and motor torques $T^M_E$ (corresponding to full throttle of the engine) and $T^M_M$. This information is available to the controller 67 (see FIG. 2A) at 251. The position of the accelerator pedal and brake pedal 55, 57 defines a pedal parameter between 0 and 1, corresponding to which are a carrier speed $N_C$ and desired engine and motor torques $T^D_E$ and $T^D_M$, shown at 253. The controller checks to see if $T^D_E$ exceeds $T^M_E$, or $T^D_M$ exceeds $T^M_M$ i.e., if the torque demand on either the motor or the engine exceeds what is currently being produced. This is done at 255. If the answer is yes, then the controller upshifts (257), i.e., from either the electric mode to the charge mode or from the charge mode to the assist mode. Thus, if the vehicle is starting from a stop position and the operator depresses the pedal fully, the vehicle will start in the electric mode (=1) and shift through the charge into the assist mode where maximum torque is delivered to the wheels. If the answer at 255 is "NO", then upshift is not possible (259) and the controller checks for a possible downshifting operation (from assist to charge or from charge to battery).

A downshift in the mode (from assist to charge or from charge to battery) is made in accordance with FIG. 7B. At any given time, the current operating condition of the vehicle is given by engine and motor speeds $N^A_E$ and $N^A_M$ where the subscript E and M refer to the engine and motor respectively and the superscript A refers to the actual state of the vehicle. Corresponding to the engine and motor speeds $N^A_E$ and $N^A_M$ are maximum engine and motor torques $T^M_E$ (corresponding to full throttle of the engine) and $T^M_M$. This information is available to the controller 67 at 291. The position of the accelerator and brake pedals defines a pedal parameter between 0 and 1, corresponding to which are a carrier speed $N_C$ and desired engine and motor torques $T^D_E$ and $T^D_M$, shown at 293. The controller checks to see if $T^D_E$ is less than $T^M_E$ multiplied by a scaling factor F (295) where a typical range of F is between 0.3 and 0.98. If not, no downshifting is done (301). The scaling factor F limits the torque of the motor (electric mode) to ensure that the charging mode has higher torque output than the electric mode. Further, it must be noted that the scaling factor F will not be a constant but may vary as a function of battery state of charge, and vehicle speed. A lower value of the scaling factor F causes more charging of the batteries, and a higher value of the scaling factor F causes the vehicle to be more in the electric mode. At 297, the controller checks to see if $T^D_M$ is less than $T^M_M$ multiplied the scaling factor F. If not, no downshifting is done (301). If the answer is "YES", then a check is made to see if the time the vehicle has been in the current mode $t_{mode}$ exceeds some threshold minimum time $t_{min}$. If the answer is "NO", then no downshifting is done (301). If, however, the answer is "YES", then a downshifting of the mode occurs (303), from assist mode to charge mode or from charge mode to electric mode. The purpose of having a minimum time in any mode is to ensure that mode downshifting does not occur too rapidly.

At zero pedal positions, the output torques are set at negative values to allow for regeneration. When the vehicle is in motion and the driver needs to slow down, the first action is to stop depressing the gas pedal, allowing the regenerative torque to decelerate the vehicle. If more deceleration is needed, manual brakes will be applied by the driver. Those versed in the art would recognize that the only mode that can efficiently apply regenerative braking for prolonged periods of time is electric. In order to engage the regenerative braking, the controller is designed so that at very low pedal positions, the electric mode will engage and the sun drive is locked.

Regeneration can be briefly applied in the assist mode as well. In the assist mode, if the driver suddenly releases the gas pedal 55 (see FIG. 2A) for a brief period of time and then depresses it again, it is undesirable to shift modes in order to avoid frequent stopping and starting of the engine. This "brief period" of time is determined from testing. In order to satisfy the torque requirements, both the sun and ring torque will have to be negative. This is easy in the case of the ring gear since the motor can produce negative torques in the regenerative mode. In the case of the sun gear, the engine's frictional torque is not enough to balance the torques for any reasonable regenerative torque. Accordingly, the engine brake 126 in FIG. 2C is applied. The negative regenerative torque of the motor/generator results in a positive torque on the sun and causes the engine to speed up. The speed controller senses this and adjusts the braking torque on the engine to maintain the sun speed close to the desired speed. After the "brief period" of time has elapsed, if deceleration is maintained by the driver, then the controller gradually reduces the sun speed to zero and the vehicle shifts to the regenerative mode.

The main goal of the hybrid arrangement is improved fuel economy and reduced emissions. This is accomplished by maintaining the engine at its most efficient operating condition. Those versed in the art would recognize, that in addition to speed, the load is important in fuel economy and emission. In a conventional parallel hybrid arrangement, the torque output is a weighted sum of the outputs of the two power plants. However, in a conventional drivetrain, the operating speed is not independently controllable. In the present invention, the speed can be maintained around the optimum in the charge and assist mode but control of the load is lost. In order to compensate for this, an overdrive unit 111 in FIG. 2B with a ratio of 0.797:1 is installed between the engine and the sun.

The function of the overdrive unit is as follows. When the driver requirements drop in torque but the system is still operating in the charging mode, the torque on the sun will drop. The overdrive is engaged, resulting in an increase in the engine torque requirements. In the maps, the operating points at which this overdrive will be engaged is recognized and the desired sun speed will be adjusted higher in order to keep the engine at that same optimum speed. By raising the sun speed, the resulting negative motor speed will increase in magnitude, increasing the charging power. The overdrive 111 in FIG. 2B is automatically engaged when the engine throttle position (not the gas pedal position) drops below a certain threshold and disengaged with the throttle position exceeds a maximum. In the preferred embodiment, a value of 0.6 is used for the minimum and 0.8 for the maximum throttle positions that determine the operation of the overdrive, respectively. Those versed in the art would recognize that the thresholds would depend upon the type of engine. The goal of engaging and disengaging the overdrive 111 in FIG. 2B is to keep the engine as loaded as possible but without using fuel enrichment. This minimizes exhaust emissions and Brake Specific Fuel Consumption (BSFC). Computer simulations indicate that an improvement of 5 miles per gallon is obtained in the US06 driving cycle using this strategy.

As discussed above, charging will be accomplished by reversing the direction of motor rotation and engaging the overdrive on the carrier output. If the previous mode of operation was electric (engine stopped). The controller will anticipate the shift from electric to assist mode and start the engine a short period of time prior to the engagement of the overdrive and brought up to a prespecified speed (e.g. 3500 r.p.m.) with the engine clutch (not shown) disengaged. This short period is determined by simulation and testing. While the mode shifting is in progress, the engine clutch will be engaged and the sun brake 126 released by the controller, forcing the sun to speed up. When the engine clutch is fully engaged, the engine is close to its desired operating speed and the engine controller can continue to regulate the engine speed. During this time, the overdrive 119 on the output is engaged and the motor torque command drops to zero. After all of this is accomplished, the kinematic constraints force the motor to reverse direction. The rate at which the clutch engages is adjusted to achieve gradual mode transition of the vehicle.

Shifting from the assist to the charge mode is simpler. The output overdrive engagement and the torque command reduction to zero are sufficient to accomplish the shifting.

When the vehicle is under full power acceleration from low speed, the motor does all the work initially. At a carrier speed selected from the maps, the engine 83 must be engaged. The controller starts the engine before this carrier speed is reached, speeds up the engine and declutches the engine while the motor torque is zero for a brief period (in order to allow its speed to drop). The steps of starting the engine, speeding it up and declutching are coordinated to avoid delays in the acceleration of the vehicle.

The lack of a multispeed transmission is not noticed at full load acceleration on a level road. The gear ratios are set so that the vehicle can operate in the electric, assist or charge mode up to normal cruising speeds. In the present invention, charging is possible at highway cruising speeds. This is essential because the assist mode will have to be engaged often when passing or climbing hills at high speed.

Computer simulations show that by using the low gear of the two speed gearbox 121, a reasonable acceleration is possible on a 20% grade at 65 mph. With the same gearing, charging mode can be engaged at a somewhat higher speed on level road with a maximum speed of 105 mph in the assist mode, more than adequate for highway passing.

The described drivetrain is specifically suited for engines that operate at maximum efficiency in a relatively narrow speed range because the drivetrain decouples the engine speed from the vehicle speed. Those versed in the art would recognize that spark ignition engines can be designed with a tuned intake manifold, so that the pressure wave propagation in the manifold improves the volumetric efficiency and reduces pumping losses for a particular speed range. The manifold design governs what this range will be. As the speed deviates from the tuned speed range, efficiency drops dramatically. A conventional parallel hybrid power train would not be able to exploit this advantage.

The foregoing description has been limited to specific embodiments of this invention. It will be apparent, however, that variations and modifications may be made to the disclosed embodiments, with the attainment of some or all of the advantages of the invention. In particular, the invention may be modified to make density and acoustic measurements. Therefore, it is the object of the appended claims to cover all such variations and modifications as come within the true spirit and scope of the invention.

What is claimed is:

1. A vehicle moved by a plurality of power devices, the vehicle comprising a power train that includes a planetary gear system, wherein at least one of said plurality of power devices operates at a substantially constant speed when the vehicle is in motion, said substantially constant speed selectable based upon a mode of operation of the vehicle.

2. The vehicle of claim 1 wherein the at least one power device having a substantially constant speed is an internal combustion engine.

3. The vehicle of claim 1 wherein the plurality of power devices comprises an electric motor/generator.

4. The vehicle of claim 2 wherein the internal combustion engine is operatively coupled to the sun gear of the planetary gear system.

5. The vehicle of claim 1 further comprising a set of wheels for enabling the vehicle to move over the ground and a first overdrive operatively coupled to the planetary gear system and the wheels, the first overdrive enabling the at least one power device to have a substantially constant speed and load when the vehicle is in motion.

6. The vehicle of claim 1 further comprising a set of wheels for enabling the vehicle to move over the ground and a two speed differential transmission interposed between the planetary gear system and the wheels.

7. The vehicle of claim 1 further comprising a second overdrive coupled to the at least one power device having a substantially constant speed and the planetary gear system.

8. The vehicle of claim 3 wherein the electric motor/generator is operatively coupled to the ring gear of the planetary gear system.

9. The vehicle of claim 5 wherein the first overdrive is operatively coupled to the carrier gear of the planetary gear system.

10. The vehicle of claim 1 wherein the mode selected from the group consisting of: (i) electric mode, (ii) charge mode, (iii) assist mode, and, (iv) regenerative mode.

11. The vehicle of claim 10, further comprising a processor, said processor adapted to switch the vehicle from one of said modes to another of said modes.

12. The vehicle of claim 10, further comprising a brake for locking the sun gear when the vehicle is in the electric mode.

13. The vehicle of claim 10, further comprising a brake for locking the sun gear when the vehicle is in the regenerative mode.

14. The vehicle of claim 2 wherein the mode is selected from the group consisting of: (i) electric mode, (ii) charge mode, (iii) assist mode, and, (iv) regenerative mode, further comprising:

(a) a motor/generator; and (b) a processor, said processor adapted to switch the vehicle from one of said modes to another of said modes based upon an actual internal combustion engine speed, an actual motor/generator speed, a desired vehicle speed and a plurality of setpoint tables.

15. The vehicle of claim 14, further comprising a brake for locking the sun gear when the vehicle is in the electric mode.

16. The vehicle of claim 14, further comprising a brake for locking the sun gear when the vehicle is in the regenerative mode.

17. For a vehicle moved by a plurality of power devices wherein at least one of said plurality of power devices has a substantially constant speed when the vehicle is in motion, a power train comprising:

(a) a planetary gear system operatively coupled to the plurality of power devices and a set of wheels on the vehicle;

(b) a first overdrive gear coupled to the at least one said power device having a substantially constant speed;

(c) a second overdrive gear coupled to the planetary gear system and the set of wheels;

wherein said overdrive gears maintain the at least one power device at a substantially constant speed and load when the vehicle is in motion.

18. The power train of claim 17 wherein the at least one power device in a substantially constant speed is operatively coupled to the sun gear of the planetary gear system.

19. The power train of claim 18 wherein the vehicle is operable in a mode selected from the set consisting of: (i) electric mode, (ii) charge mode, (iii) assist mode, and, (iv) regenerative mode.

20. The power train of claim 19, further comprising a processor, said processor adapted to switch the vehicle from one of said modes to another of said modes.

21. For a vehicle moved by a plurality of power devices, the vehicle comprising a power train that includes a planetary gear system, a processor for controlling the power train so as to maintain at least one of the power devices at a substantially constant speed when the vehicle is in motion said substantially constant speed selectable based upon a mode of operation of the vehicle.

22. The processor of claim 21 wherein said processor maintains the at least one of the power devices at a substantially constant speed when the vehicle is in motion based upon the actual speed of the power devices, the speed of the vehicle and a plurality of setpoint tables.

23. The processor of claim 21 further comprising a memory device for storing the setpoint tables.

24. For a vehicle powered by a first power device, a method of operating the vehicle so as to maintain the first power device at a substantially constant speed when the vehicle is in motion, comprising:

(a) coupling the first power device to a planetary gear system;

(b) coupling a second power device to the planetary gear system; and (c) coupling the planetary gear system to a set of wheels on the vehicle for enabling the vehicle to move over the ground; and (d) using a processor on the vehicle to
  (i) select a mode of operation of the vehicle, and
  (ii) select the substantially constant speed based upon said mode of operation.

25. The method of claim 24, further comprising coupling a first overdrive to the planetary gear system and the first power device.

26. The method of claim 24, further comprising coupling a second overdrive to the planetary gear system and the set of wheels.

27. The method of claim 25, further comprising coupling a second overdrive to the planetary gear system and the first power device.

28. The method of claim 24, further comprising applying a torque control to the second power device.

* * * * *